No. 804,531.  
PATENTED NOV. 14, 1905.  
H. W. GROVE.  
BERTH OR BUNK.  
APPLICATION FILED JAN. 30, 1905.

2 SHEETS—SHEET 1.

No. 804,531. PATENTED NOV. 14, 1905.
H. W. GROVE.
BERTH OR BUNK.
APPLICATION FILED JAN. 30, 1905.

2 SHEETS—SHEET 2.

UNITED STATES PATENT OFFICE.

HENRY WILLIAM GROVE, OF HULL, ENGLAND.

BERTH OR BUNK.

No. 804,531.  Specification of Letters Patent.  Patented Nov. 14, 1905.

Application filed January 30, 1905. Serial No. 243,317.

*To all whom it may concern:*

Be it known that I, HENRY WILLIAM GROVE, ironmonger's buyer, a subject of the King of Great Britain, residing in Hull, in the county of York, England, have invented certain new and useful Improvements in Berths or Bunks, (for which application has been made in Great Britain, No. 17,007, dated August 3, 1904,) of which the following is a specification.

This invention relates to an improved bunk or berth for use on shipboard, and has for its object to prevent any seasickness on the part of the occupant owing to the motion of the vessel.

In order that the invention may be fully understood, reference will now be had to the accompanying drawings, in which—

Figure 1:
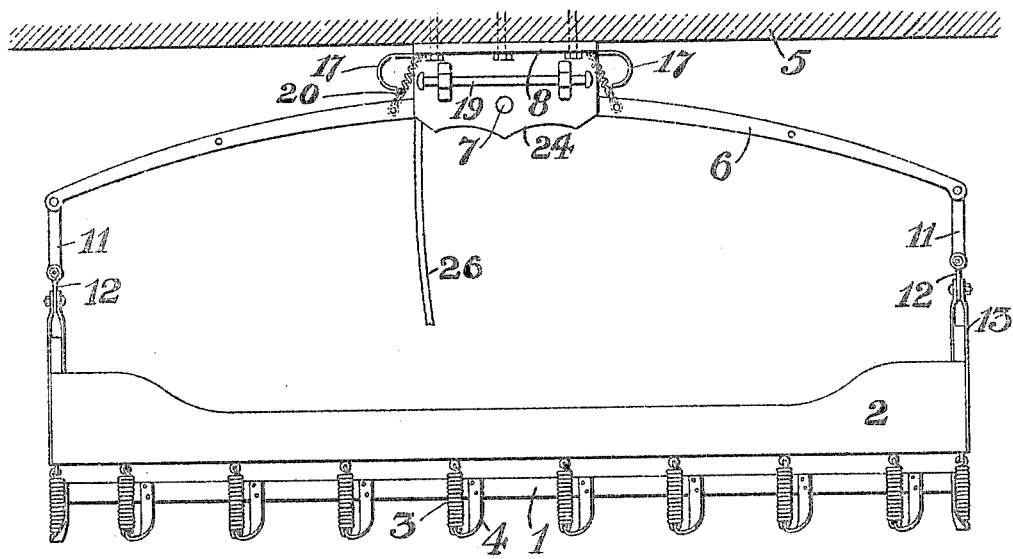
Figure 2:
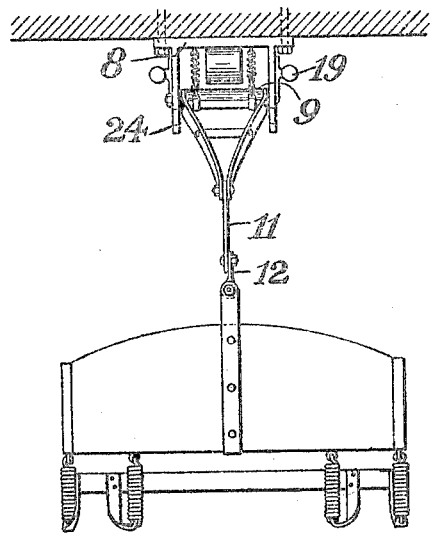
Figure 3:
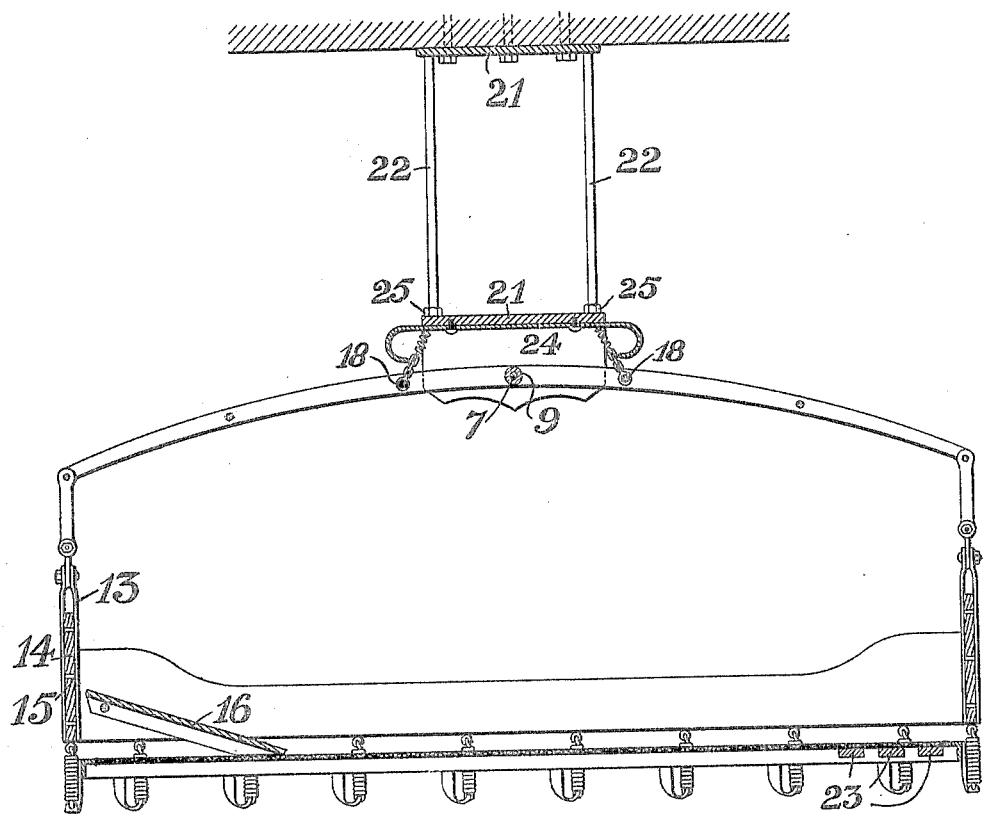
Figure 4:
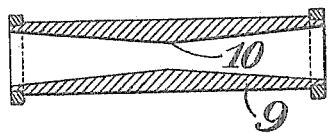

Figure 1 is a side elevation of the bunk; Fig. 2, end view of the same; Fig. 3, a sectional side view of the bunk, showing the bunk suspended from a bracket in order to bring it nearer to the floor. Fig. 4 is a detail view.

In the drawings, 1 is a spring-mattress suspended from the main frame 2 of the berth by means of long springs 3, secured to the mattress 1 by means of pendent brackets 4, which brackets enable extra-long springs 3 to be employed, and so the effects of vibration and rising and falling are avoided.

The berth or bunk is suspended from the ceiling 5 of the cabin by means of a beam 6, capable of swinging in a vertical plane about a pivot 7, located in a bracket 8, provided with cheek-pieces 24. This beam 6 is preferably formed of two side pieces meeting together at their extremities, but gradually widening out to their pivotal point, as shown in the drawings. In order that the beam may be capable of slight movement in a vertical plane across the bunk, it is provided with a tubular bearing-piece 9. (Shown in detail in Fig. 4.) This bearing piece or tube 9 is tapered toward its center, so that the point 10 in the middle of the tube-piece acts as a knife-edge on the pivot 7. The berth or bunk is suspended from the beam 6 by means of links 11 at its ends, which links engage with further and smaller links 12, the eyelet-holes of which are turned at right angles the one to the other, so that the links 12 can be secured to the supports 13 at the ends of the bunk and at the same time allow the bunk to swing transversely. The supports 13 are preferably formed, as shown in the drawings, so as to embrace both sides of the end pieces 14, being secured thereto by suitable rivets or screws 15.

16 represents a head-rest.

In order to prevent beam 6 from coming into contact with the ceiling of the cabin owing to heavy seas, curved springs 17 are secured to the end of the side bracket 8, so as to encounter cross-pieces 18 of the beam 6 and take up the momentum of the bunk. On the sides of the bracket 8 are provided handles 19 to enable persons to easily get in and out of the bunk. As is well known, the human body is heavier toward the head than toward the feet. The bunk would naturally therefore have a tendency to lie somewhat inclined with the head end depressed. In order to overcome this tendency, counterweights 23 are arranged on the mattress-frame 1, while springs 20 are arranged between the bracket 8 or some stationary part of the beam 6 in order to keep the bunk approximately level when unoccupied. In the drawings four such springs (two at each end) are shown. It is, however, obvious that springs arranged at the head end of the bunk alone would serve the object desired equally well or that springs alone might be used without the counterweights. Further, as a point of convenience a strap or the like, 26, is hung from the bracket 8 to enable persons to raise themselves up when lying in the bunk.

As it sometimes happens that the roof of the cabin is somewhat high and it is at the same time desired to have the bunk near the floor, it is necessary to employ some such device as the stationary but adjustable bracket shown in Fig. 3, comprising the plates 21 and the vertical rods 22 and nuts 25 or some such similar device.

I declare that what I claim is—

1. In a bunk or berth, a bunk or berth frame, means for supporting the same, a mattress, dependent brackets on said mattress, and coiled springs between said bunk-frame and the lower end of said dependent brackets.

2. In a bunk or berth, a bunk or berth frame, means for supporting the same, means for permitting both longitudinal and lateral swing of said frame, a mattress, dependent brackets on said mattress, and springs secured to the lower ends of said brackets and to said frame, substantially as described.

3. In a bunk or berth, a bunk or berth frame, a beam, means for supporting said beam from one point, means for allowing lateral swing of said bunk relatively to said beam, a mattress, dependent brackets on said mattress, and springs secured to the lower ends of said dependent brackets and to said frame, substantially as described.

4. In a bunk or berth, a bunk or berth frame, a beam supporting said frame, a bracket supporting said beam, cheek-pieces on said bracket, handles on said cheek-pieces, means for permitting longitudinal swing of said beam, a mattress, dependent brackets on said mattress, and springs secured to the lower end of said dependent brackets and to said frame.

5. In a bunk or berth, a bunk or berth frame, a beam supporting said berth-frame, means for permitting longitudinal swing of said beam, stops on said beam, a bracket supporting said beam, and springs projecting from said bracket and adapted to contact with said stops on the beam swinging beyond a certain limit.

6. In a bunk or berth, a bunk or berth frame, a beam supporting said berth-frame, means for permitting longitudinal swing of said beam, stops on said beam, a bracket supporting said beam, cheek-pieces on said bracket, handles on said cheek-pieces, and springs projecting from said bracket and adapted to contact with said stops on the beam swinging beyond a certain limit.

7. In a bunk or berth, a bunk or berth frame, a beam supporting said frame, a bracket supporting said beam, cheek-pieces on said bracket and handles on said cheek-pieces, means for permitting lateral and longitudinal swing of said frame, and a mattress resiliently suspended from said frame.

8. In a bunk or berth, a bunk or berth frame, a beam supporting said frame, a bracket supporting said beam, cheek-pieces on said bracket, handles on said cheek-pieces, and means for suspending said bracket and adjusting the height thereof, and a mattress resiliently hung from said bunk-frame.

9. In a bunk or berth, a bunk or berth frame, means for supporting said frame, means for permitting lateral and longitudinal swing of said frame, a mattress, dependent brackets on said mattress, springs between said frame and the lower end of said dependent brackets, and means for keeping the bunk horizontal whether occupied or empty.

10. In a bunk or berth, a beam, links secured to said beam, a bunk or berth frame, supports on said frame, further links between said supports and said frame, a mattress, dependent brackets on said mattress, and springs secured to the lower end of said dependent brackets and to said frame.

11. In a bunk or berth, a bunk or berth frame, a beam, means for allowing longitudinal and lateral swing of said frame relatively to said beam, a mattress, dependent brackets on said mattress, and springs secured to the lower end of said dependent brackets and to said frame.

12. In a bunk or berth, a bunk or berth frame, a beam, means for allowing lateral swing of said frame relatively to said beam, means for allowing longitudinal swing of said frame parallel to said beam, a mattress, dependent brackets on said mattress, and springs secured to the lower end of said dependent brackets and to said frame.

13. In a bunk or berth, a bunk or berth frame, a beam for supporting said frame, links on said beam, supports on said frame, and further links with eyelets at right angles connecting the first links and the supports, in combination with a mattress resiliently suspended from said frame, substantially as and for the purpose described.

In witness whereof I have hereunto signed my name, this 14th day of January, 1905, in the presence of two subscribing witnesses.

HENRY WILLIAM GROVE.

Witnesses:
 JOHN HENRY THORPE,
 WILLIAM HARWOOD ATKINSON.